June 14, 1966 J. G. HEIMOVICS 3,255,799
FASTENING MEANS FOR SECURING ONE PIECE TO ANOTHER
Filed Nov. 5, 1963
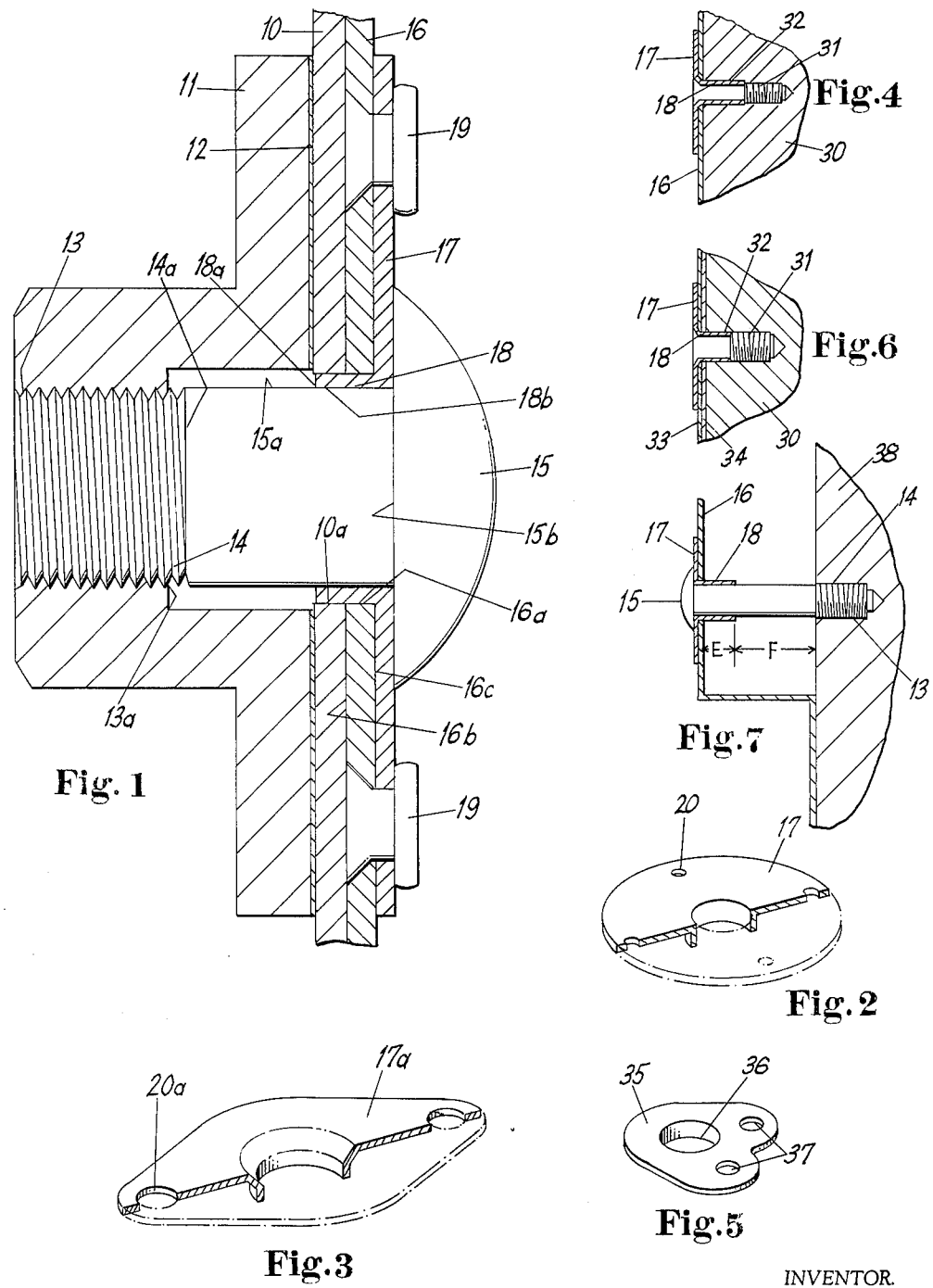
INVENTOR.
JOHN G. HEIMOVICS,
BY
Jungbluit, Melville, Strasser + Foster
ATTORNEYS.

United States Patent Office 3,255,799
Patented June 14, 1966

3,255,799
FASTENING MEANS FOR SECURING ONE
PIECE TO ANOTHER
John G. Heimovics, Kansas City, Mo., assignor to Armco Steel Corporation, Middletown, Ohio, a corporation of Ohio
Filed Nov. 5, 1963, Ser. No. 321,479
1 Claim. (Cl. 151—69)

This invention resides in the provision of novel fastening means for securing one piece to another and more particularly to an arrangement in which the fastening means is prevented from being removed from one of the pieces.

It is, of course, abundantly old in the art to employ fastening means such as a bolt and nut for securing one piece to another. It is also old, although of more recent vintage, to attach the nut firmly to one of the pieces and to provide bolt receiving holes in the two pieces in alignment with the nut whereby the two pieces may be secured by passing the bolt through the aligned holes and screwing it into the nut which is fixed to one of the pieces as previously indicated. Even in systems like this, however, if one finds it necessary or expedient to separate the two pieces for any reason, the bolt will often drop from the assembly when it is screwed out of the nut in order to separate the two pieces. This is costly in terms of materials and time.

It is not necessary in the practice of this invention, however, that the novel fastener must be screwed into a counterbored nut. Any counterbored tapped hole will serve as well as a counterbored nut.

Accordingly, an important object of this invention is to provide a fastening means or system that prevents the bolt from being removed from one of the pieces it is used to assemble when these pieces are disassembled.

A further important object of the invention is to provide a fastening means that not only achieves the aforementioned object but which also enables the fastener system to take maximum shear and tensile forces.

Yet another object of the fastener system of this invention is to provide fastening means that can be attached to a plate, machine part, fixture or assembly so as to aid in positioning such item, while keeping the bolt, for example, loose until after such item has been positioned as desired.

A further object of the invention is to provide a novel fastener which is able to take greater shear than a standard bolt of the bolt diameter used in the fastener system by having a lip member surround the fastener body, thereby increasing its shear diameter.

Another object of this invention is to provide an arrangement for fastening panels to bases wherein the panel will not shift alignment while the fastener elements are loosened.

Another object of this invention is to provide a novel fastener wherein a bolt is secured to one piece, loose but so that it cannot drop out, and which piece is to be fastened to another piece but not flush against it, and wherein the bolt may be pre-positioned by eliminating alignment wobble.

Another advantage and object of this invention is to arrange the novel fastener so that the retainer diameter or bearing area is larger than the bolt head so that the fastener produces greater and better bearing surface with respect to the plate to which it is fastened than would a standard fastener.

More specifically, an important object of the invention is to provide a piece, which piece is to be secured to another piece, having a bolt arranged therein so that the bolt may be screwed tight and loosened numerous times without dropping out of the first mentioned of these two pieces.

These and other objects of the invention will become apparent to those skilled in the art from a reading of the following description, with the aforementioned remarks in mind and with reference to the accompanying drawings, in which drawings like numerals are employed to designate like parts throughout, and in which:

FIG. 1 is an enlarged, partially fragmentary, sectional view of the fastening means of this invention employed to secure one piece to another, FIG. 2 is a perspective view of a washer-like retainer element forming a part of the invention, FIG. 3 is a perspective view of another type of washer-like retainer element for a countersunk head bolt employed as a part of this invention, FIG. 4 is a fragmentary sectional view showing a bolt and retainer element in position on a panel which is to be secured to a metal base having a tapped and counterbored hole therein, FIG. 5 is a perspective view of a modified retainer element employed with the novel fastener of this invention and particularly suitable for corner assembly, FIG. 6 is a view similar to that of FIG. 4 and showing the retainer element of the novel fastener as it is used in securing two metal plates to a metal base having a tapped and counterbored hole, and FIG. 7 is a fragmentary sectional view depicting a modified form of the novel fastener of this invention in place on a Z-shaped panel section and diagrammatically illustrating the pre-positioning of the bolt portion whereby alignment wobble is substantially reduced.

Referring now to FIG. 1, a base piece 10 is shown as having a nut secured thereto in any known manner as indicated at 12; the nut 11 may be fastened to the part 10 by any convenient method or means such as welding, gluing, riveting and the like. The nut 11, of course, is threaded as indicated at 13 to receive the corresponding threads 14 of the bolt 15.

It is desired to secure the piece 16 to the piece 10 in such a way that when the bolt 15 is loosened so as to permit removal of the piece 16 from the part 10, the bolt 15 cannot be removed from retainer 17.

Accordingly, in the practice of this invention, a washer-like retainer element is secured about the shank or stem of the bolt 15 beneath its head. The means for securing the washer-like retainer element 17 to the bolt 15 is such that it is still possible to rotate the bolt with respect to the element 17.

The preferred manner of securing the washer-like element 17 to the bolt 15 is to slide it on the bolt shank with a slip-fit or running-fit between the shank 15a and the inside of the retainer lip 18b before the threads are rolled. Another, but less preferred manner, is to swage the element 17 thereon. The diameter of the unthreaded bolt portion 15a, and the inside diameter of the cylindrical projection lip 18b, are smaller, at least, than the minimum major thread diameter 14 of the bolt 15.

After the washer-like retainer element 17 has been engaged with the bolt 15, the element 17 is then secured to the piece 16. In order to accomplish this the piece 16 is provided with a bore 16a which will just nicely receive the cylindrical projected lip 18 therein. When the factor of shear between the piece 16 and the part 10 is present, in the preferred form of the invention, the projected cylindrical lip 18 must extend beyond the inner surface 16b of the piece 16 when the element 17 is flush with the outer surface 16c of the piece 16. The element 17, with the bolt 15 therein, may then be secured to the piece 16 by any of a number of known arrangements. In FIGURE 1 the element 17 is shown as secured to the piece 16 by means of the rivets 19. To this end the element 17 of FIGS. 1 and 2 is provided with rivet receiving holes 20 while the modified element 17a of FIG. 3 is provided with the rivet receiving holes 20a.

As earlier indicated, other means may be employed to secure the element 17 to the piece 16. In any event, it will be understod that even when the element 17 is engaged with the bolt 15, this bolt 15 will be rotatable therein so that it may be screwed into a conuterbored nut 11, or into a counterbored and tapped hole in a suitable base as will be further described, when the member or piece 16 having the element 17 fixed thereto is brought against the piece 10 to which it is to be fastened.

It will be understod that the member 16 will usually have a plurality of the elements 17 (with bolts 15 therein) secured to it. Accordingly, the part 10 will be provided with a plurality of orifices 10a to receive the various bolts 15. In the preferred arrangement of this invention the projected cylindrical lip 18 of the element 17 extends not only beyond the piece 16 but also substantially into the orifice 10a; this latter orifice, therefore, will ordinarily be of a dimension to just nicely receive the cylindrical lip 18. The extension of the inner end 18a of the lip 18 beyond the inner surface 16b of the piece 16 allows prepositioning of piece 16 against part 10 due to the insertion of the lip 18 into the hole 10a. Final attachment of the piece 16 to the piece 10 is accomplished simply by screwing the bolt 15 into the nut 11 as permitted by the threads 13–14.

Another type of application is illustrated in FIG. 7 wherein the distance F is several times greater than the diameter D of the bolt shank 15a and the length E of the lip 18 is also greater than the said diameter D. The inside diameter 18b has a close running fit with the bolt shank 15a thereby eliminating any wobble in the bolt 15. The anti-wobble feature facilitates rapid assembly by pre-alignment where the element 17 is located some distance from the part 38 having a tapped hole. Since the lip 18 does not have to equal the length E plus F, then the added shear strength provided with the preferred form of the invention is not of primary importance in this modification.

Three important results are achieved by the arrangement of this invention. One, when it is for any reason desired to remove temporarily the piece 16 from the piece 10, as often occurs in industries wherein it is desired to remove a panel for inspection and whereafter the panel is then to be replaced, the relationship between the internal diameter of the projected cylindrical lip 18 and the maximum diameter of the threads 14 will prevent the bolt 15 from falling out of the assembly 16–17. This is true whether the lip 18 is slipfitted about the bolt shank before the bolt threads are rolled, or swaged about the bolt portion 15a.

Two, by having the projected cylindrical lip extend a substantial distance into the part 10, much increased resistance to shear, as would ordinarily occur between the pieces 10 and 16, and which would be concentrated at the shank of the bolt 15 in the area of the juncture of plates 10 and 16, is achieved.

Three, when rapid assembly is desired, where the section of piece 16 containing element 17 is not flush against the part 38 (FIG. 7), then the modification of making lip 18 length E greater than the diameter D of the bolt shank 15a provides pre-alignment of the threads 13 of the part 38 with the threads 14 of the bolt 15.

In the arrangement as shown in FIG. 1 it is desirable that the length of the unthreaded portion of the shank of the bolt 15, that is, the distance between the underside of the bolt head 15b and the start of the threads 14a be approximately equal to or preferably slightly less than the length of the unthreaded portion of the counterbored nut plus the combined thickness of the retainer 17, piece 16 and the piece 10. The length of the threads 14 must be slightly less than the distance between the end 18a of the projected cylindrical lip 18 and the start of the thread 13a in the counterbored nut. By this arrangement, in those cases wherein the lip 18 is closely affixed on the bolt shank, or swaged about the bolt shank, there will be sufficient clearance for the bolt to be unscrewed from the nut prior to the time the threads 14 engage the inner end 18a of the lip 18.

Referring now to FIGURE 4 there is shown an arrangement wherein the retainer element 17 is used (in conjunction with a countersunk head bolt, shown in this figure) to clamp a plate 16 to a metal base 30 having a tapped hole 31 therein and counterbored as indicated at 32. The cylindrical lip 18 extends through the plate 16 into the counterbored hole 32. The threaded shank of this bolt may be received in a tapped hole like that shown at 31 in the base 30 (which hole is counterbored as indicated at 32 to receive the cylindrical lip 18), or the bolt may be received in a threaded nut like that shown at 11 in FIGURE 1, which nut is secured to the plate 10 as indicated at 12.

In FIGURE 6 the invention is shown as it would be used (also in conjunction with a bolt shown in this figure) to secure two metal plates 33 and 34 to a solid metal base 30 having the tapped hole 31 therein, which hole is counterbored as indicated at 32 to receive the cylindrical lip 18 of the retainer element 17.

In FIGURE 5 there is depicted a retainer element 35 especially designed for corner assembly. The bolt receiving orifice 36 is located at the end of the element 35 which will be towards the corner and the rivet receiving holes 37 are located in the wider portion which will be removed from the corner.

It is believed that the invention has been fully described in the foregoing passages and that the invention is also clearly shown in the accompanying drawings. It should be understood, however, that although the invention has been described and shown in connection with certain particular structures and arrangements, the invention is not to be limited to these particular structures and arrangements except insofar as they are specifically set forth in the subjoined claim. It will be apparent to those skilled in the art that modifications may be made in this invention without departing from the scope and spirit thereof.

Having thus described the invention, what is claimed as new and desired to be protected by United States Letters Patent is:

An arrangement for securing a first piece to a second piece comprising a nut fixed to said second piece, a washer-like element having means by which it is immovably fixed to said first piece and overlying said first piece, said first piece and said second pieces abutting each other, said washer-like element having a circular lip projecting through said first piece into said second piece, said first piece and said second piece having apertures to receive said lip, the external diameter of said lip being substantially equal to the diameters of said apertures, the inside surface of said lip being smooth and cylindrical, a bolt having a shank extending through said first piece and said washer-like element and said second piece, said bolt having a head which abuts said washer-like element, said bolt being movable with respect to said first piece and said washer-like element, the end of said shank removed from said head being threaded to engage said nut whereby to secure said pieces together, the said shank of said bolt having a smooth cylindrical portion between said head and the threaded portion of said shank, said lip engaging said shank between said head and the threaded portion of said shank, the distance from the end of said lip to the start of the threads in said nut being slightly greater than the length of the threaded portion of said shank, the said nut including a counter bore to receive the smooth cylindrical portion of said shank, and the minimum major thread diameter of said bolt shank being greater than the inside diameter of said lip, whereby when said bolt is disengaged from said nut and said pieces separated from one another, said bolt will be prevented from coming free of said first piece by engagement of said lip with the threaded portion of said shank.

References Cited by the Examiner
UNITED STATES PATENTS

| | | | |
|---|---|---|---|
| 1,251,676 | 1/1918 | McCaffray | 151—69 |
| 2,709,470 | 5/1955 | Knohl | 151—69 |
| 2,853,112 | 9/1958 | Poupitch | 151—69 |
| 2,919,736 | 1/1960 | Kann | 151—69 |
| 2,972,367 | 2/1961 | Wootton | 151—69 |

FOREIGN PATENTS

| | | |
|---|---|---|
| 1,234,416 | 5/1960 | France. |
| 604,017 | 6/1948 | Great Britain. |

EDWARD C. ALLEN, *Primary Examiner.*

UNITED STATES PATENT OFFICE
CERTIFICATE OF CORRECTION

Patent No. 3,255,799                                      June 14, 1966

John G. Heimovics

It is hereby certified that error appears in the above numbered patent requiring correction and that the said Letters Patent should read as corrected below.

The Fig. 1 of the drawings should illustrate the diameter of unthreaded bolt portion 15a as being smaller than the minimum major thread diameter 14 of bolt 15. The internal diameter of retainer lip 18b corresponds to the diameter of 15a whereby the retainer has a slip-fit on the unthreaded bolt portion 15a but will abut the larger diameter threads as illustrated in Figs. 4, 6 and 7.

Signed and sealed this 10th day of October 1967.

(SEAL)
Attest:

EDWARD M. FLETCHER, JR.                      EDWARD J. BRENNER
Attesting Officer                                   Commissioner of Patents